March 17, 1942. B. I. HAYFORD ET AL 2,276,653
METAL CLAD SWITCHGEAR
Filed Nov. 24, 1937    2 Sheets-Sheet 1

INVENTORS:
Benjamin I. Hayford &
Arthur L. Fletcher
ATTORNEY

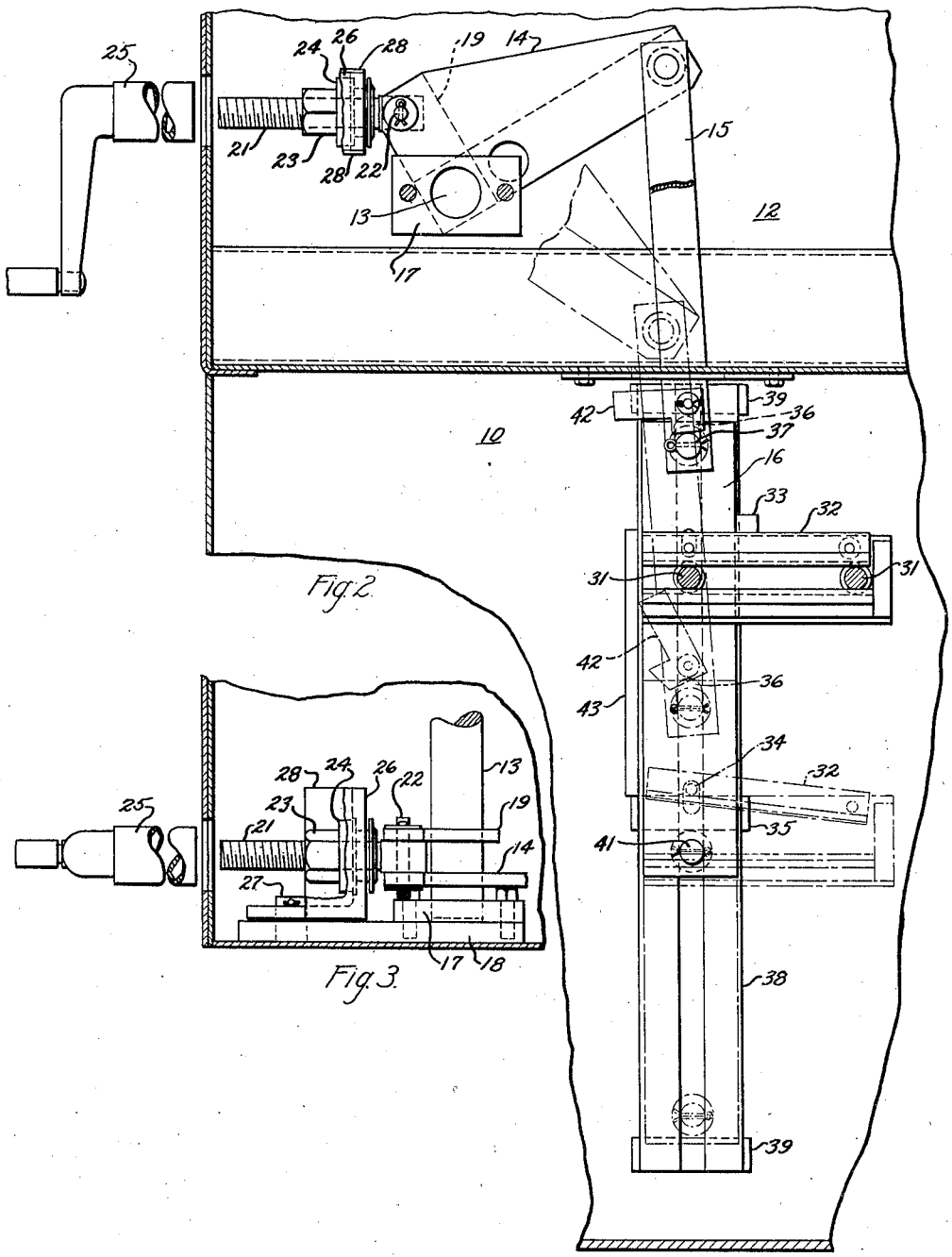

Patented Mar. 17, 1942

2,276,653

UNITED STATES PATENT OFFICE 2,276,653

METAL CLAD SWITCHGEAR

Benjamin I. Hayford, Wilkinsburg, and Arthur L. Fletcher, Pittsburgh, Pa., assignors to Westinghouse Electric & Manufacturing Company, East Pittsburgh, Pa., a corporation of Pennsylvania Application November 24, 1937, Serial No. 176,264

6 Claims. (Cl. 175—298)

Our invention relates, generally, to metal clad switchgear and more particularly to switchgear of the vertical lift type in which the circuit breaker unit is raised vertically within the cell to the operating position.

In metal clad switchgear of the vertical lift type in which small circuit breakers are utilized, it is necessary to provide an elevating device for the breaker designed to push the breaker off the main disconnect contacts, as well as raise it to the engaged position, because of the light weight of the breaker unit. Furthermore, because of the unevenness of the floors where these small units are frequently installed it is desirable to have a wide tolerance in the entering position to permit placing the breaker in the cell without adjustment of the elevating device.

An object of our invention, generally stated, is to provide an elevating device having the foregoing features which is simple in operation and which may be economically manufactured and installed.

A more specific object of our invention is to provide an elevating device having a predetermined amount of flexibility in the lowered position and which will rigidly support a breaker unit in the operating position.

Other objects of our invention will be explained fully hereinafter or will be apparent to those skilled in the art.

For a fuller understanding of the nature and objects of our invention, reference may be had to the following detailed description, taken in conjunction with the accompanying drawings, in which:

Fig. 2 is a view, in section, taken along the line II—II of Fig. 1; and,

Fig. 3 is a view, partially in plan and partially in section, showing a portion of the elevating device illustrated in Figs. 1 and 2.

Figure 1:
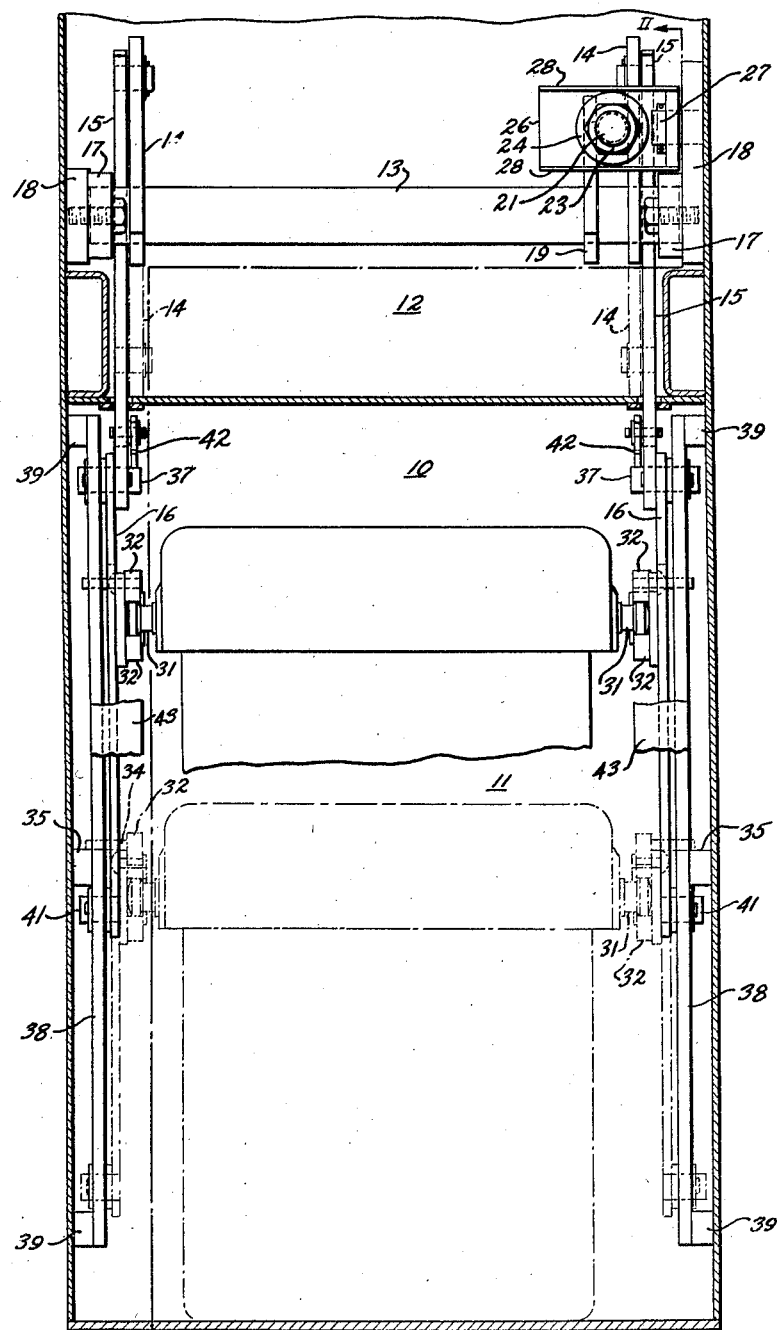
Figure 1 is a view, partially in elevation and partially in section, of a switchgear structure embodying our invention.

Referring to the drawings, the structure shown comprises a sheet-metal cell 10 of a type usually provided for housing a circuit breaker unit 11. A superstructure 12 is provided at the top of the cell 10 in which power conductors (not shown) may be disposed for connection to the circuit breaker 11 through primary disconnect contacts (not shown), which may be of the usual type having stationary contact members mounted in the superstructure 12 and movable contacts carried by the circuit breaker 11.

In accordance with the usual practice, the breaker unit 11 is raised vertically in the cell by an elevating device, which will be described more fully hereinafter, to the operating position, shown by the solid lines in Fig. 1, and lowered to the position shown by the broken lines from which it may be removed from the cell, if desired, by means of a suitable transport truck.

Since the circuit breaker 11 is of a relatively small size, the friction of the primary disconnect contacts may be so great that the breaker unit will not be lowered by gravity. Therefore, it is necesary that the elevating device be capable of pushing the breaker off the disconnect contacts as well as raising it to the engaged position. Also it is desirable that the elevating device have sufficient flexibility to permit the breaker unit to be inserted in the housing and engaged by the elevating device without making adjustments where uneven floors are encountered, as is frequently the case.

In order to accomplish the foregoing results, we have devised an elevating device which comprises a shaft 13 with two crank arms 14 connected by links 15 to elevating members 16, one of which is disposed at each side of the cell 10. The ends of the shaft 13 are rotatably mounted in bearings 17 which are bolted to plates 18, secured to the sides of the housing 10. A short lever 19 and one of the crank arms 14 at one end of the shaft are connected to a screw 21 by means of a pin 22. The screw 21 extends through a nut 23 which is so disposed in a thrust bearing 24 that the shaft 13 is rotated when the nut is turned by a socket wrench 25. The thrust bearing 24 is mounted in an angle member 26 that is pivotally mounted on one of the plates 18 by means of a pin 27. Reenforcing plates 28 are provided on the top and the bottom of the angle member 26 to strengthen it. The screw 21 is irreversible to prevent the breaker from being dropped when the socket wrench 25 is released.

The breaker unit has two lugs or studs 31 on each side which are engaged by the elevating device to raise the breaker to the operating position. The supporting studs 31 enter between two members 32 carried by each one of the elevating members 16 disposed at each side of the breaker. The upper members 32 are hinged at the rear to permit their front end to swing upwardly for clearance when the breaker enters the housing.

As shown in Fig. 2, the hinges at the rear of the bars 32 have close clearance, which prevents rocking of the breaker unit when the breaker mechanism is being operated. It will be seen that the upper members 32 are engaged by stops 33 to close the hinged members against the front studs on the breaker when it is in the raised position, thereby rigidly supporting the breaker unit. When the elevating device is in the lowered position, a pin 34 in each one of the hinged members 32 engages a stop 35 in the housing to raise the hinged member to provide a wide opening for the studs 31 on the breaker.

The amount of clearance for the breaker supports is still further increased by providing elongated openings 36 in the lower ends of the links 15 for pins 37 which connect the links 15 to the elevating members 16, thereby permitting a predetermined amount of lost motion between the members 16 and the links 15. In this manner, the entire carriage assembly is permitted to raise in the slotted openings 36 as the breaker lugs 31 slide under the hinged members 32.

It will be noted that the vertical movement of the elevating members is guided by slotted guide members 38, one of which is secured to each side of the housing 10 and spaced therefrom by spacing members 39. The pins 37, which connect the links 15 to the elevating members 16 and similar pins 41, disposed at the lower ends of the members 16 slide in the vertical slots provided in the guide members 38.

In order to remove the lost motion from the elevating device when the breaker is in the operating position, a latch member 42 is pivotally mounted on each one of the links 15 above the pins 37. The latch members are so shaped that they are actuated by gravity to engage the pins 37 and prevent them from traveling in the slots 36. In this manner the breaker is immediately pushed off the primary disconnect contacts when the elevating mechanism is lowered and the breaker is prevented from falling the length of the slots 36 when the contacts are disengaged.

As shown in Fig. 2, one arm of the latching member 42 is engaged by a plate 43 on the guide member 38 to raise the latch member to a position which permits the pin 37 to travel in the slot 36 when the elevating device is in the lowered position. In this manner the latching devices are rendered ineffective and the lost motion in the elevating device is available to permit the breaker to be inserted readily in the housing and on the elevator carriage even where uneven floors are encountered.

From the foregoing description, it is apparent that we have provided a simple and efficient elevating device for raising and lowering a circuit breaker unit inside of a cell or housing. The device herein described is particularly adapted for use with relatively small units of switchgear which require that the elevating mechanism be capable of forcing the breaker downwardly as well as raising it upwardly. However, it will be understood that present device is not limited in its application to circuit breaker structures of the type herein shown, but may be utilized for handling breakers of other types.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In switchgear apparatus, in combination, a cell structure, a circuit breaker unit disposed in the cell structure, supporting means secured to the breaker unit, vertically movable members disposed at each side of the cell structure, guide members for said vertically movable members, means carried by said vertically movable members for engaging said circuit breaker supporting means, crank arms for raising and lowering said vertically movable members, means for actuating said crank arms, and links for connecting the crank arms to the vertically movable members, said links having elongated openings therein to provide lost motion between the links and the vertically movable members.

2. In switchgear apparatus, in combination, a cell structure, a circuit breaker unit disposed in the cell structure, supporting means secured to the breaker unit, vertically movable members disposed at each side of the cell structure, guide members for said vertically movable members, means carried by said vertically movable members for engaging said circuit breaker supporting means, crank arms for raising and lowering said vertically movable members, means for actuating said crank arms, links for connecting the crank arms to the vertically movable members, said links having elongated openings therein to provide lost motion between the links and the vertically movable members, and latching means for preventing said lost motion when the vertically movable members are in the raised position.

3. In switchgear apparatus, in combination, a cell structure, a circuit breaker unit disposed in the cell structure, supporting means secured to the breaker unit, vertically movable members disposed at each side of the cell structure, means carried by said vertically movable members for engaging said circuit breaker supporting means, crank arms for raising and lowering said vertically movable members, means for actuating said crank arms, links for connecting the crank arms to the vertically movable members, said links having elongated openings therein to provide lost motion between the links and the vertically movable members, latching means for preventing said lost motion when the vertically movable members are in the raised position, and means on said guide members for releasing said latching means when the vertically movable members are in the lowered position.

4. In switchgear apparatus, in combination, a cell structure, a circuit breaker unit disposed in the cell structure, a crank arm for raising the breaker unit in the cell, means for connecting the crank arm to the breaker unit, means for guiding the movement of the breaker unit in the cell, and means for actuating the crank arm.

5. In switchgear apparatus, in combination, a cell structure, a circuit breaker unit disposed in the cell structure, a crank arm for raising the breaker unit in the cell, means in the cell for rotatably supporting the crank arm, means for connecting the crank arm to the breaker unit, means for guiding the movement of the breaker unit in the cell, and means for actuating the crank arm.

6. In switchgear apparatus, in combination, a cell structure, a circuit breaker unit disposed in the cell structure, a crank arm for raising the breaker unit in the cell, means in the cell for rotatably supporting the crank arm, pivotal means for connecting the crank arm to the breaker unit, means for guiding the movement of the breaker unit in the cell, and rotatable means for actuating the crank arm.

BENJAMIN I. HAYFORD.
ARTHUR L FLETCHER.